United States Patent
Naoi

(10) Patent No.: US 8,833,842 B2
(45) Date of Patent: Sep. 16, 2014

(54) VEHICLE BODY FRONT STRUCTURE

(75) Inventor: Daisuke Naoi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/704,621

(22) PCT Filed: May 17, 2011

(86) PCT No.: PCT/JP2011/061290
§ 371 (c)(1),
(2), (4) Date: Dec. 16, 2012

(87) PCT Pub. No.: WO2011/162047
PCT Pub. Date: Dec. 29, 2011

(65) Prior Publication Data
US 2013/0093215 A1   Apr. 18, 2013

(30) Foreign Application Priority Data
Jun. 24, 2010  (JP) ................. 2010-143872

(51) Int. Cl.
*B62D 25/08* (2006.01)
*B62D 25/14* (2006.01)

(52) U.S. Cl.
CPC ............. *B62D 25/08* (2013.01); *B62D 25/14* (2013.01)
USPC ................. 296/203.02; 296/193.09

(58) Field of Classification Search
USPC ................. 296/193.09, 203.02, 191
See application file for complete search history.

(56) References Cited

FOREIGN PATENT DOCUMENTS

| JP | 63-168167 | 11/1988 |
|---|---|---|
| JP | 8-324440 | 12/1996 |
| JP | 2003-191862 | 7/2003 |
| JP | 2007-210567 | 8/2007 |
| JP | 2008-080818 | 4/2008 |
| JP | 2008-094134 | 4/2008 |

OTHER PUBLICATIONS

International Search Report for PCT/JP2011/061290, Date of Completion: Jul. 8, 2011, Date of Mailing: Jul. 19, 2011.
International Search Report dated Jul. 8, 2011.

*Primary Examiner* — Glenn Dayoan
*Assistant Examiner* — Melissa A Black
(74) *Attorney, Agent, or Firm* — Rankin, Hill & Clark LLP

(57) ABSTRACT

A vehicle body front structure includes a dashboard lower in which an opening portion into which a joint member, which connects a steering shaft of a vehicle with a steering gear box, is inserted is formed; a steering joint cover that is provided around the opening portion so as to surround the joint member; and a dashboard cross-member that extends in a left and right direction of the dashboard lower. The dashboard cross-member includes a pair of cross-members between which the steering joint cover is interposed, and each of these cross-members is fixed to the steering joint cover. Clip holes to which mounting clips mounting a steering grommet are fitted are formed within a range of the dashboard lower that is positioned around the opening portion and is covered with the steering joint cover.

13 Claims, 7 Drawing Sheets

VEHICLE BODY FRONT STRUCTURE

TECHNICAL FIELD

The present invention relates to a vehicle body front structure.

Priority is claimed on Japanese Patent Application No. 2010-143872, filed Jun. 24, 2010, the content of which is incorporated herein by reference.

BACKGROUND ART

In general, a vehicle body includes a pair of front side frames that are disposed at the front portion of a vehicle and form left and right frame portions of an engine room, and a dashboard (dash panel) that partitions an engine room from a cabin (vehicle interior) which occupants enter. Rear ends of the pair of front side frames are joined to the front surface of the dashboard.

Further, there is a case where cross-members extending in the left-and-right direction of the vehicle are provided on the dashboard. In this case, it is possible to spread a load by transmitting a frontal collision load, which is transmitted from the front side frames, to the cross-members and to increase the stiffness of the dashboard (for example, see Patent Document 1).

CITATION LIST

Patent Document

[Patent Document 1] Japanese Unexamined Patent Application, First Publication No. 2008-80818

SUMMARY OF INVENTION

Technical Problem

In addition, an opening portion into which a steering shaft, which connects a steering gear box of the engine room with a steering wheel of the cabin, is inserted is formed on the dashboard. A steering joint cover is provided on the opening portion in order to prevent dust, muddy water, noise, and the like of the engine room from entering the vehicle interior.

Here, it is necessary to consider the positional relationship between the steering joint cover and the cross-members when providing the cross-members on the dashboard. That is, since the cross-members interfere with the steering joint cover even though the cross-members are to be provided at the position where the steering joint cover is disposed, it is difficult to provide the cross-members at the optimum positions.

Accordingly, the invention has been made in consideration of the above-mentioned circumstances, and an object of the invention is to provide a vehicle body front structure where steering joint cover or cross-members can be disposed at the optimum positions.

Solution to Problem

In order to achieve the object by solving the above-mentioned problem, the invention employs the following measures.

(1) That is, a vehicle body front structure according to an aspect of the invention includes: a dashboard lower in which an opening portion into which a joint member, which connects a steering shaft of a vehicle with a steering gear box, is inserted is formed; a steering joint cover that is provided around the opening portion so as to surround the joint member; and a dashboard cross-member that extends in a left-and-right direction of the dashboard lower. The dashboard cross-member includes a pair of cross-members between which the steering joint cover is interposed, and each of these cross-members is fixed to the steering joint cover. Clip holes to which mounting clips mounting a steering grommet are fitted are formed within a range of the dashboard lower that is positioned around the opening portion and is covered with the steering joint cover.

According to the aspect of (1), it is possible to dispose the steering joint cover and the dashboard cross-member at the optimum positions without considering the interference between the steering joint cover and the dashboard cross-member.

Here, in order to improve sealing performance in the steering joint cover, a steering grommet may be mounted on the surface of the dashboard lower opposite to the surface of the dashboard lower on which the steering joint cover is mounted. In this case, the steering grommet is generally mounted on the dashboard lower by studs. However, in the above-mentioned aspect, the clip holes to which mounting clips mounting the steering grommet are fitted are formed within the range of the dashboard lower that is positioned around the opening portion and is covered with the steering joint cover. Accordingly, studs may be omitted.

(2) In the vehicle body front structure according to (1), the dashboard lower may include a vertical wall and an inclined wall that obliquely extends toward the rear of the vehicle from a lower portion of the vertical wall, and the steering joint cover may be disposed near a boundary portion between the vertical wall and the inclined wall.

Since the boundary portion between the vertical wall and the inclined wall is bent in the case of (2), it is possible to enlarge the space between the dashboard lower and the steering joint cover by disposing the steering joint cover on the boundary portion. For this reason, the size of the steering joint cover does not need to be increased more than necessary, and it is possible to reliably surround a joint member. Further, it is possible to avoid the interference between the steering joint cover and the mounting clips that are used to mount the steering grommet.

(3) The vehicle body front structure according to (1) may further include a seal material that is interposed between the steering joint cover and the dashboard lower.

In the case of (3), it is possible to more reliably prevent dust or water from infiltrating from a gap between the dashboard lower and the steering joint cover by the seal material.

(4) In the vehicle body front structure according to (1), the dashboard lower may include a vertical wall and an inclined wall that obliquely extends toward the rear of the vehicle from a lower portion of the vertical wall, the dashboard cross-member may be disposed along a boundary portion between the vertical wall and the inclined wall, and the cross-members may be joined to left and right front side frames that are adjacent to the cross-members, respectively.

In the case of (4), it is possible to increase the stiffness of the dashboard lower.

(5) In the vehicle body front structure according to any one of (1) to (4), the thickness of the steering joint cover may be larger than the thickness of the dashboard cross-member, and the dashboard cross-member may have a linear shape.

In the case of (5), it is possible to increase the support stiffness for supporting the joint member and to further increase the stiffness of the dashboard lower.

Advantageous Effects of Invention

According to the vehicle body front structure of the invention, it is possible to dispose a steering joint cover and a dashboard cross-member at the optimum positions without considering the interference between the steering joint cover and the dashboard cross-member.

DESCRIPTION OF EMBODIMENTS (Vehicle Body Front Structure)(Dashboard Lower)

Next, an embodiment of the invention will be described with reference to the drawings. In addition, in the following description, the front side in the traveling direction of a vehicle may be simply referred to as the front side, the rear side in the traveling direction may be simply referred to as the rear side, the right side in the width direction of a vehicle may be simply referred to as the right side, the left side in the width direction of a vehicle may be simply referred to as the left side, the upper side in the direction of gravity may be simply referred to as the upper side, and the lower side in the direction of gravity may be simply referred to as the lower side.

Figure 1:
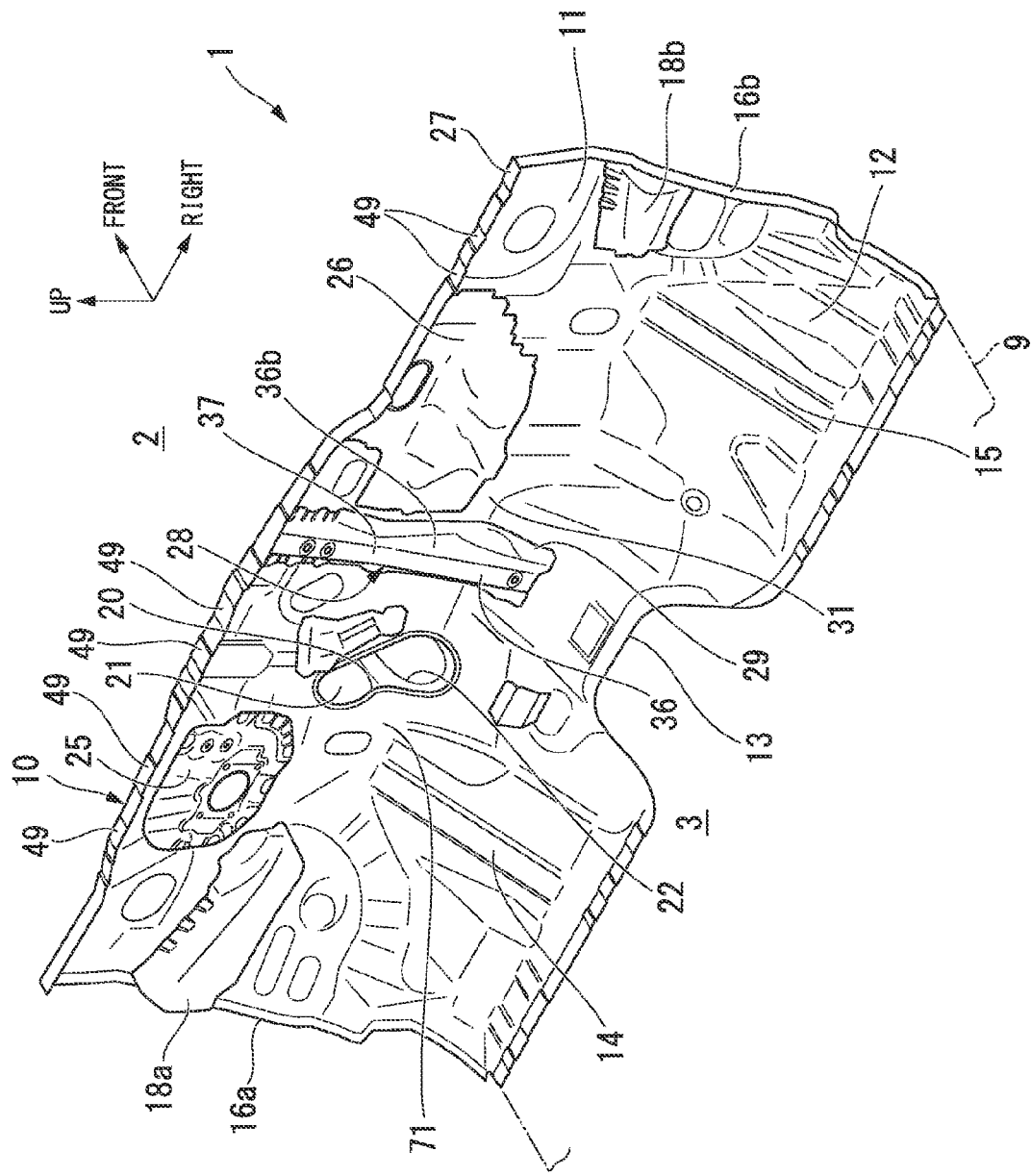
FIG. 1 is a perspective view of a dashboard lower of an embodiment of the invention when seen from a cabin.
Figure 2:
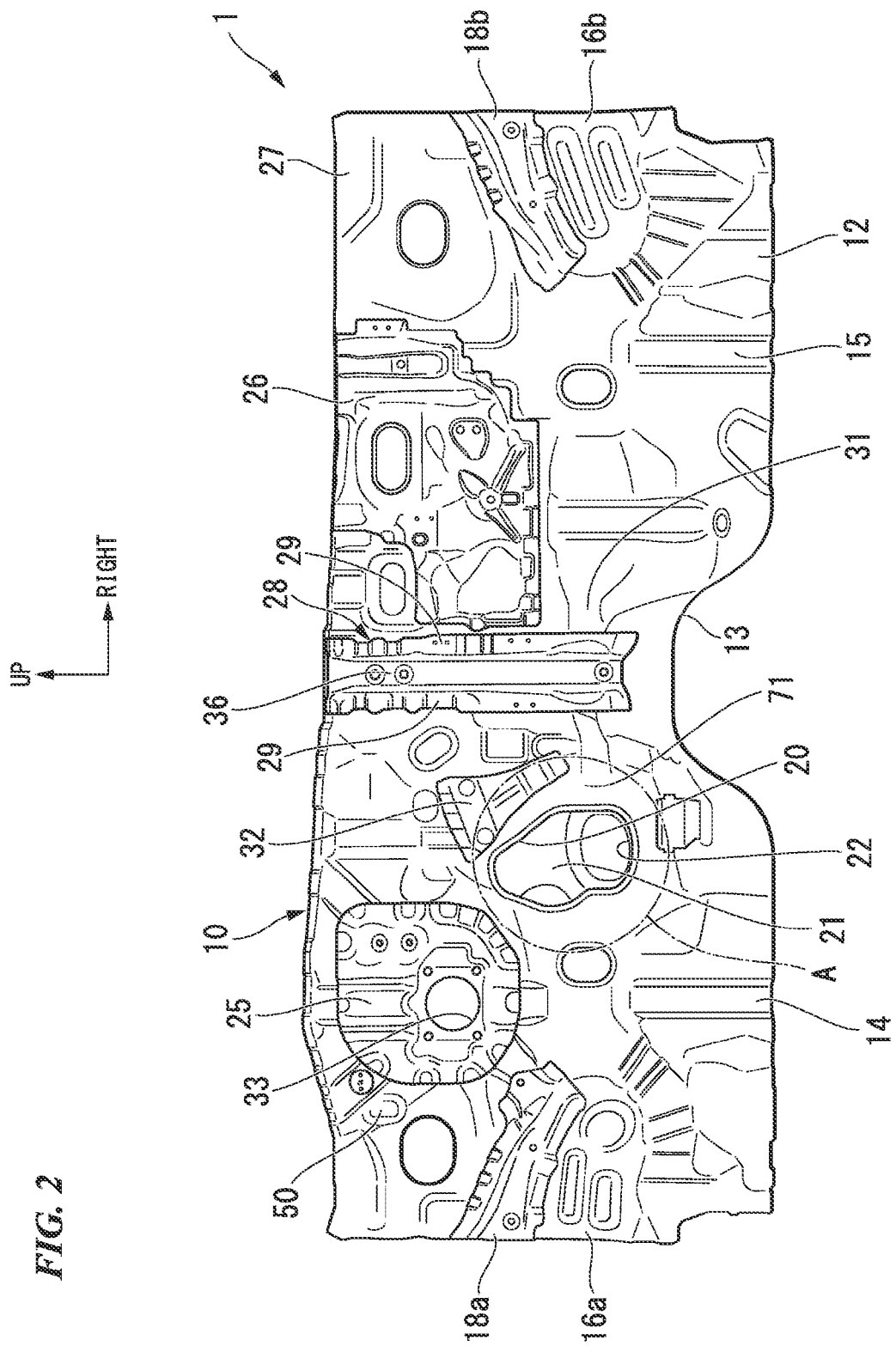
FIG. 2 is a front view of the dashboard lower when seen from the cabin.
Figure 3:
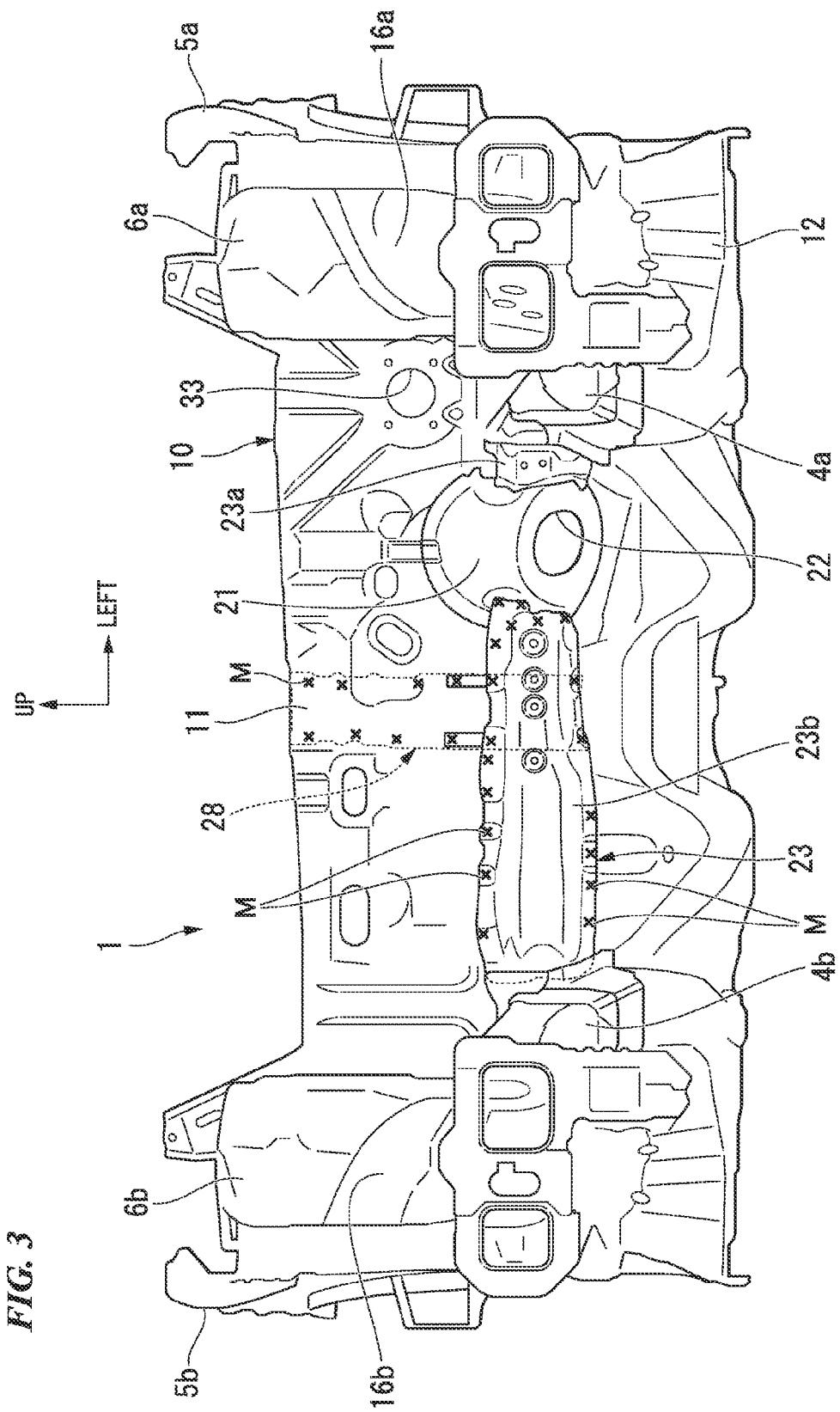
FIG. 3 is a rear view of the dashboard lower when seen from an engine room.

FIG. 1 is a perspective view of a dashboard lower when seen from a cabin. FIG. 2 is a front view of the dashboard lower when seen from the cabin. FIG. 3 is a rear view of the dashboard lower when seen from an engine room.

As shown in FIGS. 1 to 3, a vehicle body front structure 1 according to this embodiment includes: front side frames 4a and 4b that are disposed on the front side and form left and right frame portions of an engine room 2; front pillars 5a and 5b that are disposed on the rear side and the right and left outsides of these front side frames 4a and 4b and extend in the up-and-down direction; upper members 6a and 6b which are disposed on the upper side of both the front side frames 4a and 4b and of which front ends are joined to front ends of the front side frames 4a and 4b and rear ends are joined to the front pillars 5a and 5b; a dashboard lower 10 that partitions the engine room 2 from a cabin 3 disposed on the rear side of the engine room 2 and is joined to the front side frames 4a and 4b, the front pillars 5a and 5b, and the upper members 6a and 6b; and a floor panel 9 that is joined to the lower edge of the dashboard lower 10.

A dashboard lower 10 is formed by performing press working and the like on a metal member having the shape of a flat plate, and includes a vertical wall 11 that extends in the up-and-down direction and an inclined wall 12 that obliquely extends rearward from the lower portion of the vertical wall 11. Wheel house portions 16a and 16b are provided on both the left and right sides of the dashboard lower 10.

These wheel house portions 16a and 16b are formed to swell toward the cabin 3, and gussets 18a and 18b are provided at the upper portions of these wheel house portions 16a and 16b, respectively.

Rear ends of the front side frames 4a and 4b are joined to end portions of these gussets 18a and 18b, which are close to the middle side in the width direction of a vehicle, by spot welding with the dashboard lower 10 interposed between the rear ends of the front side frames 4a and 4b. In addition, the front pillars 5a and 5b are joined to end portions of the gussets 18a and 18b, which are close to the outside in the width direction of the vehicle, by spot welding, respectively.

A bent portion 27, which extends so as to be bent rearward, is formed at the upper edge of the vertical wall 11 of the dashboard lower 10. A plurality of beads 49, which protrude upward and extend in a front-and-rear direction, are formed at the bent portion 27 in the width direction of the vehicle.

On the other hand, a tunnel portion 13, which swells upward, is integrally formed in the middle of the inclined wall 12 in the width direction of the vehicle. The left side of the tunnel portion 13 is referred to as a driver's seat-side step portion 14 and the right side of the tunnel portion is referred to as a passenger seat-side step portion 15.

Further, a center frame 28, which extends in the up-and-down direction, is provided between the tunnel portion 13 and the bent portion 27 of the vertical wall 11. The center frame 28 is a reinforcing member that increases the stiffness of the dashboard lower 10.

A steering opening portion 20, which makes the engine room 2 and the cabin 3 communicate with each other, is formed at a boundary portion 71 of the driver's seat-side step portion 14 between the vertical wall 11 and the inclined wall 12. The steering opening portion 20 is an opening portion into which a steering shaft 72 or a universal joint 76 to be described below is inserted, and a steering joint cover 21 is mounted on the steering opening portion 20 so as to cover the steering opening portion (details will be described below).

Further, an accelerator pedal bracket 32, which is used to mount an accelerator pedal (not shown), is provided on the surface of the vertical wall 11, which faces the cabin 3, on the right upper side of the steering opening portion 20. Furthermore, a mounting hole 33, which is used to mount a brake master cylinder (not shown), is formed at the vertical wall 11 on the left upper side of the steering opening portion 20.

A master cylinder stiffener 25 is provided on the surface of the vertical wall 11, which faces the cabin 3, at a position corresponding to the mounting hole 33. The master cylinder stiffener 25 is formed by forming concavity and convexity on a metal member, which has the shape of a flat plate, through press working and the like. A brake master cylinder, which is not shown here, is mounted on the master cylinder stiffener 25. In addition, a damping material fixing panel 26 is provided on the vertical wall 11 at the right upper portion of the tunnel portion 13. The damping material fixing panel 26 is to fix a melting sheet (not shown) that is attached as a damping material for the dashboard lower 10, and is formed by forming concavity and convexity on a metal member, which has the shape of a flat plate, through press working and the like.

Figure 4:
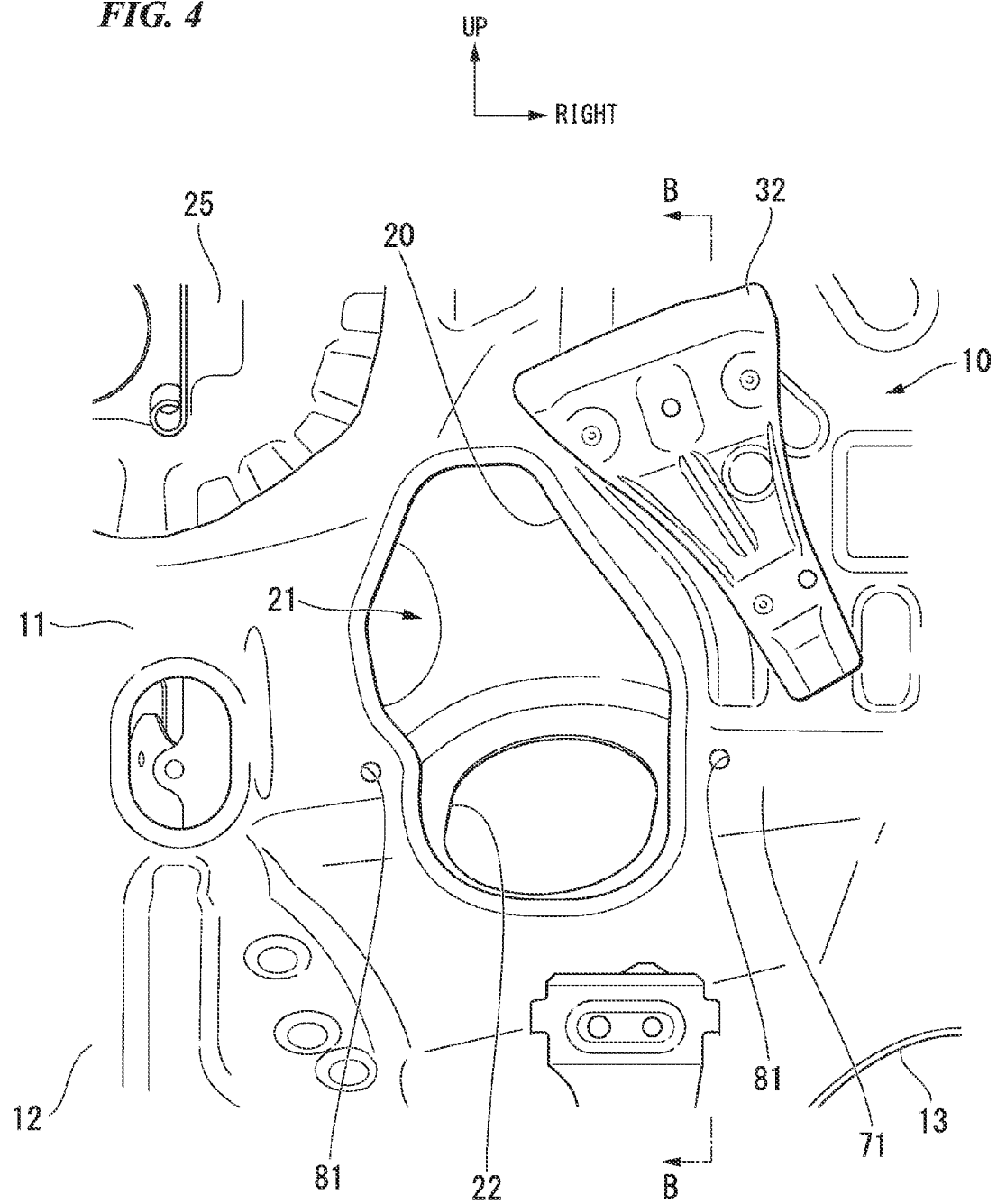
FIG. 4 is an enlarged view of a portion "A" of FIG. 2.
Figure 5:
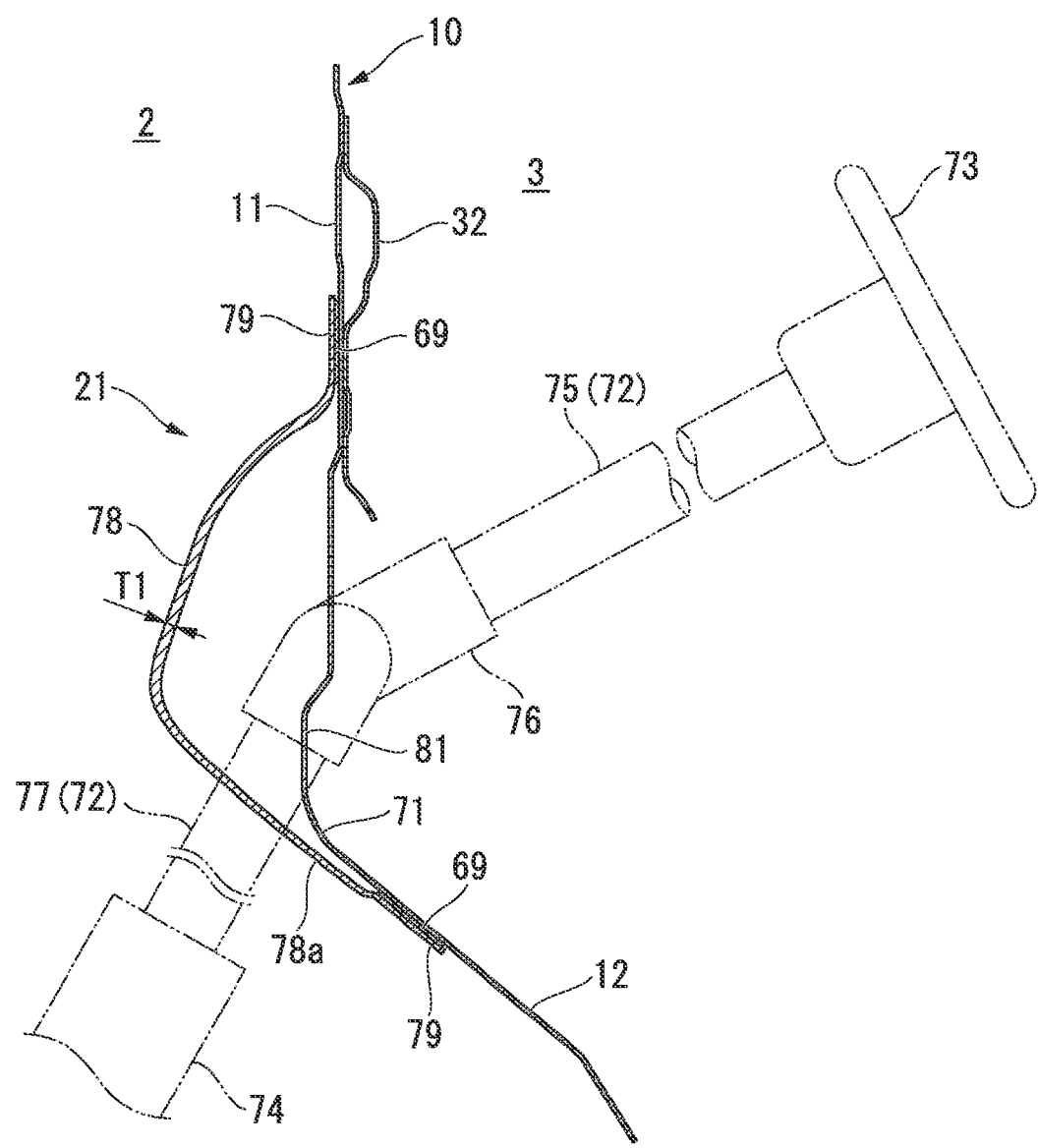
FIG. 5 is a cross-sectional view taken along line B-B of FIG. 4.
Figure 6:
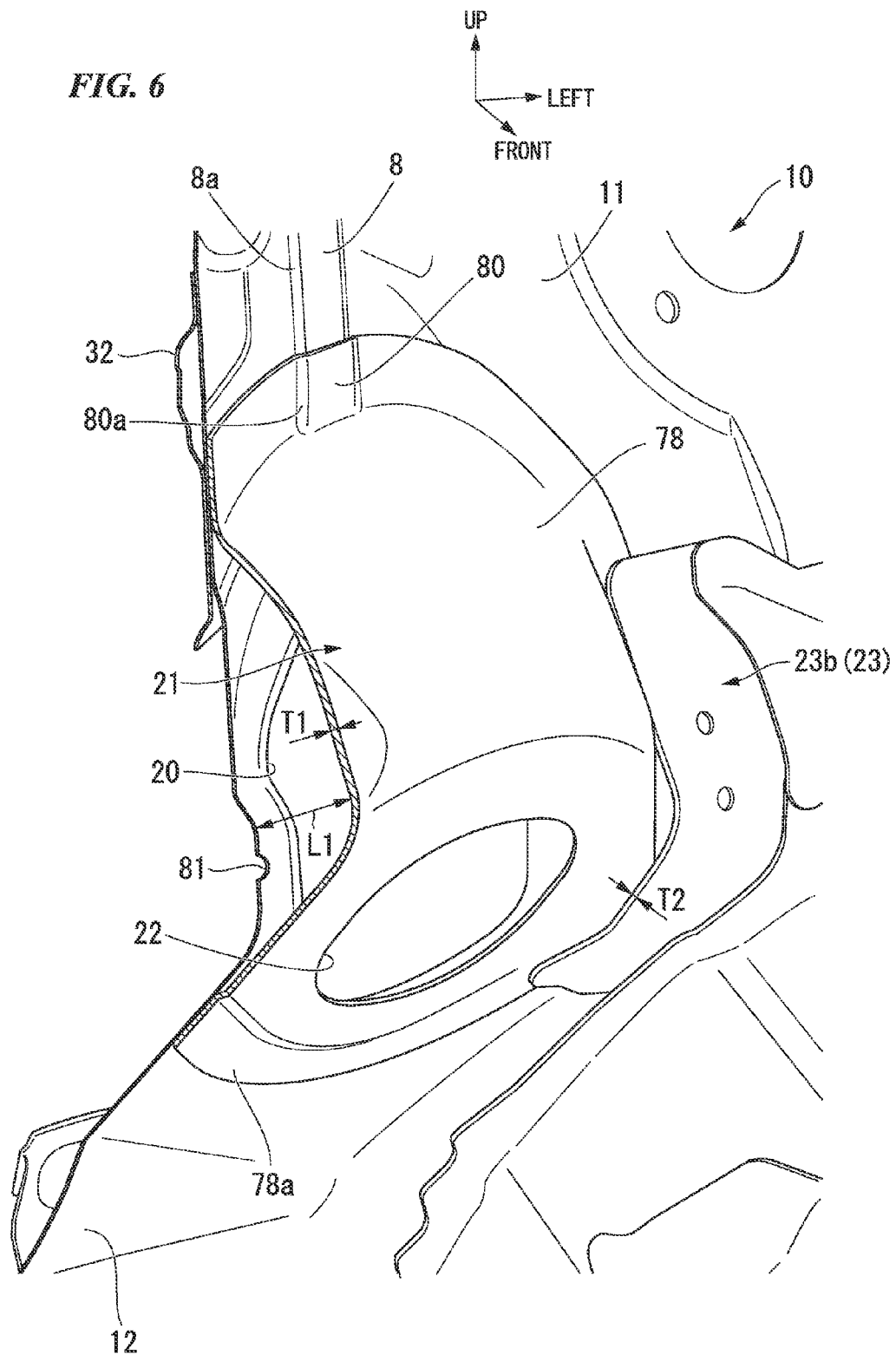
FIG. 6 is a cross-sectional perspective view taken along line B-B of FIG. 4.

FIG. 4 is an enlarged view of a portion "A" of FIG. 2, FIG. 5 is a cross-sectional view taken along line B-B of FIG. 4, and FIG. 6 is a cross-sectional perspective view taken along line B-B of FIG. 4.

As shown in FIGS. 3 to 6, the steering shaft 72 is inserted into the steering opening portion 20 that is formed at the boundary portion 71 between the vertical wall 11 and the inclined wall 12 of the dashboard lower 10.

Here, the steering shaft 72 is provided with a mechanism that transmits the rotation of a steering wheel 73 provided close to the cabin 3 to a steering gear box 74 provided close to the engine room 2. The steering shaft 72 includes a first shaft 75 that is connected to the lower end of the steering wheel 73 and a second shaft 77 of which one end is bendably connected to the lower end of the first shaft 75 by the universal joint 76.

Further, an end portion of the second shaft 77 opposite to the first shaft is connected to the steering gear box 74.

(Steering Joint Cover)

The steering joint cover 21 is mounted on the dashboard lower 10 around the steering opening portion 20 so as to cover the steering opening portion 20 from the engine room 2.

Further, the steering joint cover 21 includes a cup-shaped cover main body 78 that is formed to swell toward the engine room 2 and an outer flange portion 79 that is formed at the opening edge of the cover main body 78.

The cover main body 78 is formed so that the opening edge of the cover main body 78 is positioned outside the steering opening portion 20 formed at the dashboard lower 10. Further, a joint insertion opening 22 into which the steering shaft 72 or the universal joint 76 is inserted is formed at a bottom wall 78a of the cover main body 78.

On the other hand, a flange bead 80 is formed at the upper portion of the outer flange portion 79. The outer flange portion 79 is joined to the dashboard lower 10 by spot welding while a seal material 69 is interposed between the outer flange portion 79 and the dashboard lower 10.

Here, a bead 8 is formed on the dashboard lower 10 at a position corresponding to the flange bead 80. That is, a ridge-line 80a of the flange bead 80 and a ridgeline 8a of the bead 8 overlap each other.

Further, a pair of grommet mounting holes 81 and 81 are formed near the boundary portion 71 of the dashboard lower 10 on both sides of the steering opening portion 20 and inside the steering joint cover 21. These grommet mounting holes 81 and 81 are used to mount a steering grommet 82 to be described below.

(Steering Grommet)

Figure 7:
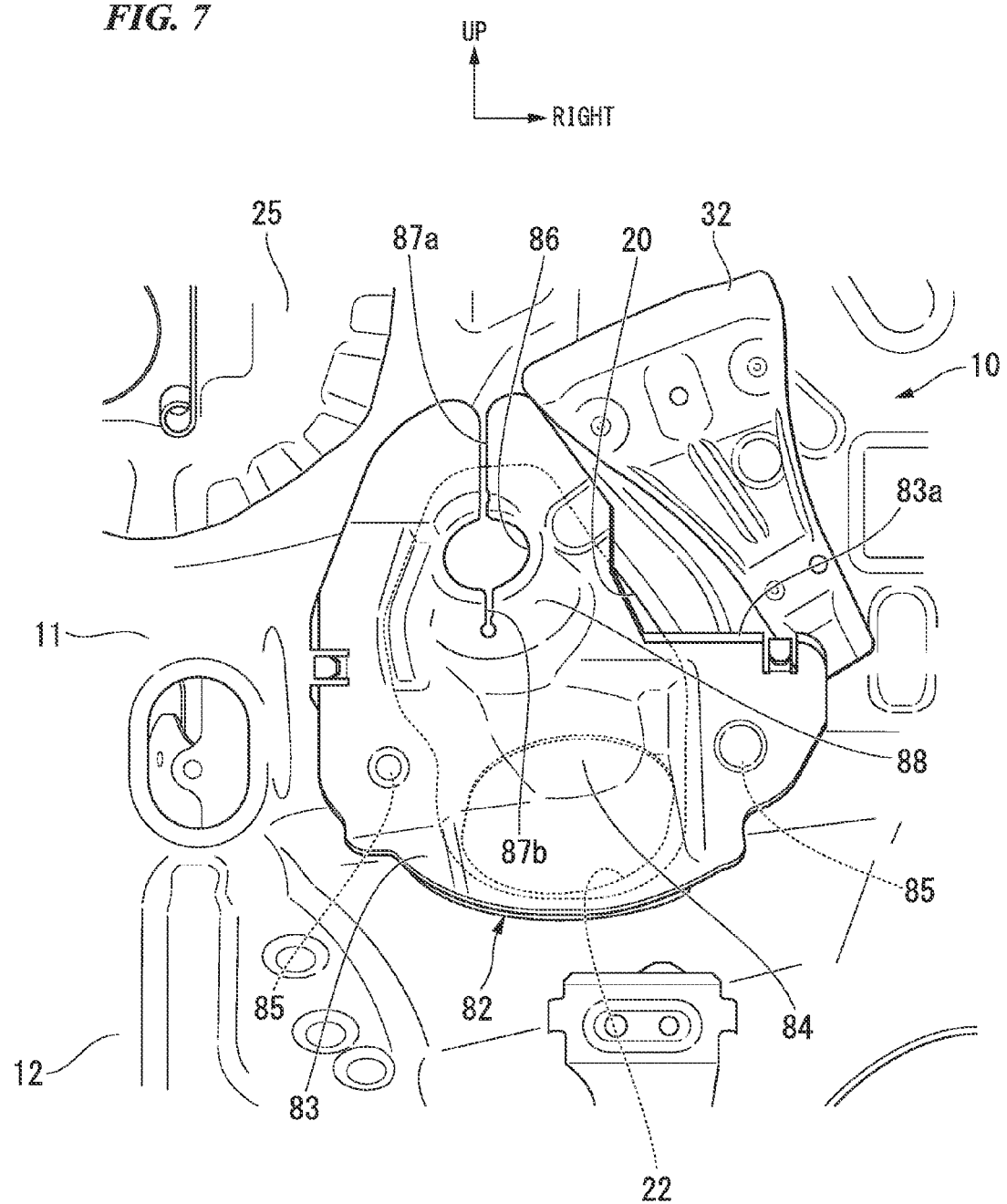
FIG. 7 is a perspective view of a steering grommet of this embodiment.

FIG. 7 is a perspective view of the steering grommet.

The steering grommet 82 is made of a resin, and is provided on the surface of the dashboard lower 10, which faces the cabin 3, so as to cover the steering opening portion 20 as shown in FIG. 7. The steering grommet 82 includes a flange portion 83 that closes the steering opening portion 20, and a grommet main body 84 that protuberates toward the cabin 3 from the center of the flange portion 83.

The flange portion 83 is formed to be larger than the steering opening portion 20, and a cutout portion 83a is formed at a position of the steering grommet corresponding to the accelerator pedal bracket 32. It is possible to avoid the interference between the steering grommet 82 and the accelerator pedal bracket 32 by forming the cutout portion 83a.

Further, mounting clips 85 and 85 are formed on the steering grommet so as to protrude toward the engine room at portions where the outer peripheral portion of the flange portion 83 overlap the circumference of the steering opening portion 20 and at positions corresponding to the grommet mounting holes 81 and 81 formed at the dashboard lower 10.

When the mounting clips 85 and 85 are inserted into the grommet mounting holes 81 and 81, respectively, these mounting clips 85 and 85 protrude from the dashboard lower 10 toward the engine room 2, that is, the steering joint cover 21 and both the mounting holes 81 and the mounting clips 85 are engaged with each other. As a result, the steering grommet 82 is fixed to the dashboard lower 10.

Here, the steering joint cover 21 is mounted so as to cover the steering opening portion 20, that is, the steering joint cover 21 is provided on the boundary portion 71 of the dashboard lower 10. Since the boundary portion 71 is a connection portion between the vertical wall 11 and the inclined wall 12, the boundary portion 71 is bent. Since the steering joint cover 21 is mounted on the boundary portion 71, a distance L1 (see FIG. 6) between the dashboard lower 10 and the cover main body 78 of the steering joint cover 21 is sufficiently ensured.

In addition to the above description, the grommet mounting holes 81 are formed near the boundary portion 71 of the dashboard lower 10. That is, the mounting clips 85 of the steering grommet 82 protrude at a position where a sufficient space is ensured between the dashboard lower 10 and the cover main body 78 of the steering joint cover 21. For this reason, it is possible to avoid interference between the mounting clips 85 and the steering joint cover 21.

In addition, the grommet main body 84 is formed of a cylindrical member which is formed so as to surround the periphery of the steering shaft 72 and of which a part is obliquely disposed so as to be parallel to the axial direction of the steering shaft 72 (first shaft 75) and protuberates from the flange portion 83. That is, the grommet main body 84 is formed so that a shaft insertion opening 86 formed at the tip of the grommet main body 84 is directed obliquely upward. Further, a tapered portion 88 is formed at the tip of the grommet main body 84.

In addition, a pair of slits 87a and 87b are formed in the up-and-down direction at the peripheral edge of the shaft insertion opening 86. The tapered portion 88 of the grommet main body 84 is formed to be flexible due to these slits 87a and 87b. The upper slit 87a of the pair of slits 87a and 87b is formed between the peripheral edge of the shaft insertion opening 86 and the outer peripheral edge of the flange portion 83. As a result, it is possible to easily mount the steering grommet 82 on the steering shaft 72.

(Dashboard Cross-member)

Returning to FIG. 3, a pair of dashboard cross-members 23, which extends over the left and right front side frames 4a and 4b, are linearly provided on the surface of the dashboard lower 10 facing the engine room 2 so that the steering joint cover 21 is interposed between the dashboard cross-members. Since the steering joint cover 21 is provided on the boundary portion 71 of the dashboard lower 10, the dashboard cross-members 23 are disposed along the boundary portion 71.

The dashboard cross-members 23 are to increase the stiffness of the dashboard lower 10 or to spread a frontal collision load, and the cross-section of the dashboard cross-member is formed substantially in the shape of a hat. Further, open sides of the dashboard cross-members 23 are joined to the dashboard lower 10 by spot welding, so that a closed cross-section structure portion is formed.

Furthermore, the dashboard cross-members 23 are divided into left and right members with the steering joint cover 21 interposed therebetween. That is, the dashboard cross-members 23 are formed of a left cross-member 23a and a right cross-member 23b.

Moreover, one end of each of the left and the right cross-members 23a and 23b is joined to the steering joint cover 21 by spot welding. That is, the left and the right cross-members 23a and 23b are connected to each other with the steering joint cover 21 interposed therebetween. On the other hand, an end portion of the left cross-member 23a opposite to the end portion of the left cross-member 23a, which is joined to the steering joint cover 21, is joined to the left front side frame 4a, which is disposed on the left side, by spot welding. In addition, an end portion of the right cross-member 23b opposite to the end portion of the right cross-member 23b, which is joined to the steering joint cover 21, is joined to the right front side frame 4b, which is disposed on the right side, by spot welding.

In addition, reference sign M of FIG. 3 denotes spot welded portions between the dashboard lower 10 and the steering joint cover 21, the dashboard cross-members 23, the master cylinder stiffener 25, the damping material fixing panel 26, and the center frame 28.

Here, the thickness T1 of the steering joint cover 21 is set to be larger than the thickness T2 of the dashboard cross-member 23 (see FIG. 6). As a result, it is possible to increase the support stiffness of the steering shaft 72 or the universal joint 76 caused by the steering joint cover 21.

Further, a concavity 31, which is long in the left and right direction, is formed on the surface of the dashboard lower 10, which faces the cabin 3, at a position corresponding to the right cross-member 23b. The dashboard lower 10 is formed to swell toward the engine room 2, so that the recess 31 is formed.

As a result, it is possible to further increase the stiffness of the portions of the dashboard lower 10 that correspond to the dashboard cross-members 23.

ADVANTAGEOUS EFFECTS

According to the above-mentioned embodiment, the dashboard cross-members 23 are divided into the left and right members with the steering joint cover 21 interposed therebetween. Accordingly, it is possible to dispose both the steering joint cover 21 and the dashboard cross-members 23 on the same line. That is, the mounting positions of the steering joint cover 21 and the dashboard cross-members 23 do not need to be shifted so as not to interfere with each other, and can be disposed at the optimum positions.

Further, the grommet mounting holes 81, which are used to mount the steering grommet 82, are formed on both sides of the steering opening portion 20 of the dashboard lower 10 and the mounting clips 85 are inserted into the grommet mounting holes 81, so that the steering grommet 82 is fixed. For this reason, it is possible to mount the steering grommet 82 without studs unlike in the related art.

Furthermore, the grommet mounting holes 81 are formed on the dashboard lower 10 at the positions that are covered with the steering joint cover 21. For this reason, the steering joint cover 21 functions as a cover that prevents dust or water from being infiltrated from the grommet mounting holes 81.

Moreover, since the steering joint cover 21 is provided on the boundary portion 71 between the vertical wall 11 and the inclined wall 12 of the dashboard lower 10, it is possible to ensure a sufficient space between the dashboard lower 10 and the cover main body 78 of the steering joint cover 21. Further, since the mounting clips 85 of the steering grommet 82 are adapted to protrude into this space, it is possible to avoid the interference between the mounting clips 85 and the steering joint cover 21. Furthermore, the size of the steering joint cover 21 does not need to be increased more than necessary and it is possible to reliably surround the periphery of the universal joint 76.

In addition, the vehicle body front structure includes the seal material 69 that is interposed between the dashboard lower 10 and the outer flange portion 79 of the steering joint cover 21. For this reason, it is possible to reliably prevent dust or water from infiltrating from a gap between the dashboard lower 10 and the steering joint cover 21.

Further, the dashboard cross-members 23 are disposed along the boundary portion 71 of the dashboard lower 10, one end of each of the left and right cross-members 23a and 23b is joined to the steering joint cover 21 by spot welding, and the end portions of the left and right cross-members opposite to the end portions of the cross-members, which are joined to the steering joint cover 21, are joined to the left and right front side frames 4a and 4b by spot welding. That is, it is possible to rigidly fix the dashboard cross-members 23. As a result, it is possible to increase the stiffness of the dashboard lower 10.

In addition, the thickness T1 of the steering joint cover 21 is set to be larger than the thickness T2 of the dashboard cross-member 23 (see FIG. 6). As a result, it is possible to increase the support stiffness of the steering shaft 72 or the universal joint 76 caused by the steering joint cover 21.

In addition, the invention is not limited to only the above-mentioned embodiment, and includes embodiments that are formed by modifying the above-mentioned embodiment in various ways without departing from the scope of the invention.

For example, a case where the first and second shafts 75 and 77 of the steering shaft 72 are connected to each other by the universal joint 76 has been described in the above-mentioned embodiment. However, the connection of the first and second shafts 75 and 77 is not limited to this. As long as the first and second shafts 75 and 77 can be connected to each other and the layout in design can satisfied, any connection may be employed.

Further, a case where metal joining of each portion is performed by spot welding has been described in the above-mentioned embodiment. However, the metal joining is not limited to this, and metal welding methods, which have been well known in the past, such as arc welding, such as TIG (tungsten inert gas) welding, MIG (metal inert gas) welding, and plasma welding; laser welding, and electron beam welding may be appropriately employed.

REFERENCE SIGNS LIST

1: vehicle body front structure
4a: left front side frame
4b: right front side frame
10: dashboard lower
11: vertical wall
12: inclined wall
20: steering opening portion (opening portion)
21: steering joint cover
22: joint insertion opening
23: dashboard cross-member
23a: left cross-member
23b: right cross-member
69: seal material
71: boundary portion
72: steering shaft
74: steering gear box
75: first shaft
76: universal joint (joint member)
77: second shaft
81: grommet mounting hole (clip hole)
82: steering grommet
85: mounting clip
L1: distance
T1, T2: thickness

The invention claimed is:

1. A vehicle body front structure comprising:
a dashboard lower in which an opening portion into which a joint member, which connects a steering shaft of a vehicle with a steering gear box, is inserted is formed;
a steering joint cover that is provided around the opening portion so as to surround the joint member; and
a dashboard cross-member that extends in a left and right direction of the dashboard lower,
wherein the dashboard cross-member includes a left cross-member and a right cross-member between which the steering joint cover is interposed, each of the left cross-member and the right cross-member is fixed to the steering joint cover, the left cross-member extends in the left and right direction to a left side of the steering joint cover, and the right cross-member extends in the left and right direction to a right side of the steering joint cover, and clip holes to which mounting clips mounting a steering grommet are fitted are formed within a range of the dashboard lower that is positioned around the opening portion and is covered with the steering joint cover.

2. The vehicle body front structure according to claim 1, wherein the dashboard lower includes a vertical wall and an inclined wall that obliquely extends toward the rear of the vehicle from a lower portion of the vertical wall, and the steering joint cover is disposed at a boundary portion between the vertical wall and the inclined wall.

3. The vehicle body front structure according to claim 1, further comprising:

a seal material that is interposed between the steering joint cover and the dashboard lower.

4. The vehicle body front structure according to claim 1, wherein the dashboard lower includes a vertical wall and an inclined wall that obliquely extends toward the rear of the vehicle from a lower portion of the vertical wall, the dashboard cross-member is disposed along a boundary portion between the vertical wall and the inclined wall, and the left cross-member is joined to a left front side frame, and the right cross-member is joined to a right front side frame.

5. The vehicle body front structure according to claim 1, wherein the thickness of the steering joint cover is larger than the thickness of the dashboard cross-member, and the dashboard cross-member has a linear shape.

6. The vehicle body front structure according to claim 2, wherein the thickness of the steering joint cover is larger than the thickness of the dashboard cross-member, and the dashboard cross-member has a linear shape.

7. The vehicle body front structure according to claim 3, wherein the thickness of the steering joint cover is larger than the thickness of the dashboard cross-member, and the dashboard cross-member has a linear shape.

8. The vehicle body front structure according to claim 4, wherein the thickness of the steering joint cover is larger than the thickness of the dashboard cross-member, and the dashboard cross-member has a linear shape.

9. The vehicle body front structure according to claim 2, wherein the opening portion is defined through the boundary portion of the dashboard lower.

10. The vehicle body front structure according to claim 4, wherein the opening portion is defined through the boundary portion of the dashboard lower.

11. The vehicle body front structure according to claim 4, wherein a first end of the left cross-member is joined to the left front side frame, and a second end of the left cross-member is fixed to the steering joint cover, the second end of the left cross-member being opposite to the first end of the left cross-member, and a first end of the right cross-member is joined to the right front side frame, and a second end of the right cross-member is fixed to the steering joint cover, the second end of the right cross-member being opposite to the first end of the right cross-member.

12. The vehicle body front structure according to claim 11, wherein the left cross-member is spaced from the right cross-member with the steering joint cover disposed within a space between the left cross-member and the right cross-member.

13. The vehicle body front structure according to claim 1, wherein the left cross-member is spaced from the right cross-member with the steering joint cover disposed within a space between the left cross-member and the right cross-member.

* * * * *